UNITED STATES PATENT OFFICE.

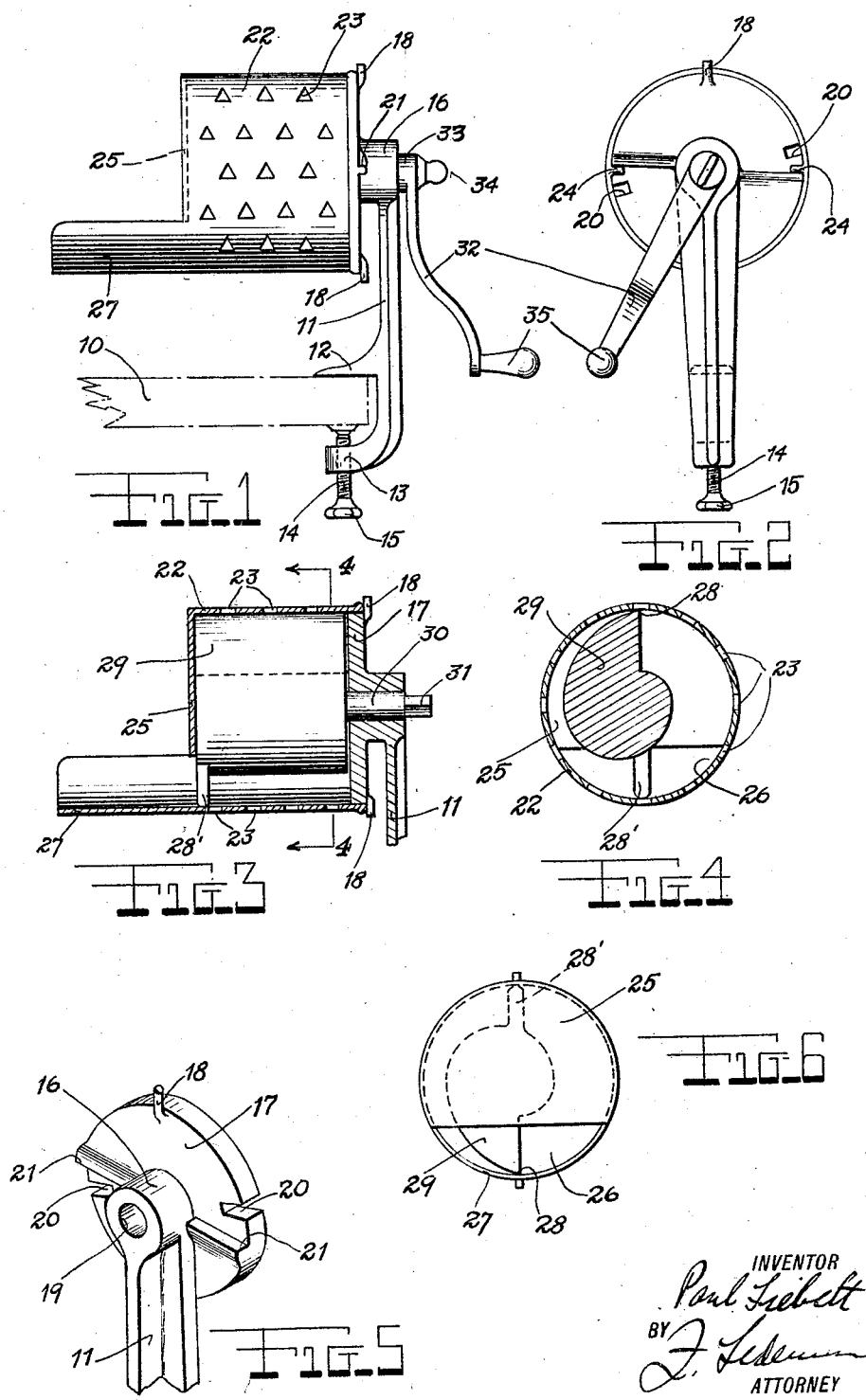

PAUL LIEBELT, OF NEW YORK, N. Y.

FOOD CHOPPER.

1,420,933.  Specification of Letters Patent.  Patented June 27, 1922.

Application filed September 23, 1921. Serial No. 502,615.

*To all whom it may concern:*

Be it known that I, PAUL LIEBELT, a citizen of Germany, residing at New York, in the county of New York and State of New York, have invented certain new and useful Improvements in Food Choppers, of which the following is a specification.

This invention relates to food choppers and has particular reference to a device used in restaurant or hotel kitchens for cutting into small pieces, meats or various kinds of vegetables, the main object being to provide a chopper which will cut the meat into small pieces, rather than force it through holes, the latter being the general method with the present day food choppers.

Another object is to provide a food chopper which is capable of being entirely dismantled by having its various parts designed so that they can be readily disengaged from one another.

Still another object is to provide a food chopper which has the meat container drum interchangeable so that various types of drums can be fitted to the device, in accordance with the size of the chopped meat desired.

These and other objects will become apparent in the description to follow in which characters of reference will refer to the like-named parts in the drawing.

Referring briefly to the drawing Figure 1 is a side elevation of the food chopper showing the knife rotating handle and the means for securing the machine to a table.

Figure 2 is a front elevation of the same.

Figure 3 is a section taken longitudinally through the food chopper drum.

Figure 4 is a section taken on the line 4—4 of Figure 3.

Figure 5 is a perspective view of the upper end of the main anchoring bracket.

Figure 6 is an end elevation looking from the meat feeding end.

Referring more in detail to the drawing the numeral 10 represents the top of a table to which is secured a vertically disposed bracket 11 having at its lower end an extension 12 adapted to engage the upper surface of the table top 10.

A lug extension 13 at the lower extreme end of bracket 11 has a screw 14 threadably engaging a hole therein. By manipulation of screw head 15 the end thereof is brought in contact with the underside of the table top 10, thus screwing the entire bracket rigidly to the table. It is obvious that various thicknesses of the table top can be accommodated in this manner.

A hub 16 having a centrally disposed hole 19 therein has formed thereto an annular disk 17. Slightly offset, diametrically opposed projections 18 extend somewhat beyond the disk diameter and are located in a vertical plane.

Extending radially from the center of disk 17 and in a horizontal plane are raised portions having their walls 21 facing in opposite directions to each other. Diametrically opposing radially formed slots 20 cut into the disk in such a manner so that there will be disk material left between the slot 20 and the walls 21 so as to provide sufficient seating surface for pins 24 formed on the drum 22.

A hollow drum 22 has a plurality of three-cornered holes 23, arranged in spaced apart relation, encircling its periphery. The drum 22 is open at its front end and has the pins 24 formed thereon, the latter located diametrically opposite to each other but converging toward the center.

The rear end of drum 22 has formed thereto a cover plate 25 so as to provide an opening 26 through which meat or vegetables are inserted into the chopper chamber. A semi-circular receiving platform 27 spanning the curved surface of the underside of the opening 26 is provided storing a surplus article of food thereon preparatory to passing it through the machine.

A chopper knife 29 having a sharp edge 28, the latter being kept in intimate contact with the interior surface of the drum by a leg 28′, engages the said surface at the opposite side.

As the meat is thrust into the drum chamber it is readily impinged against the wall thereof and is also forced into the pointed hole 23. As the spiral shaped cutter 29 is rotated and comes in contact with a series of holes, the knife edge 28 engages the holes 23 and shears off the meat into small pieces the latter then falling into a receptacle (not shown) placed conveniently on the table under the drum 22.

A circular shaft 30 having a squared shank 31 formed thereon, extends centrally from the knife member, the shaft 30 of which is adapted to revolubly engage hole 19, after which the protruding shank 31 engages hub 33 of crank arm 32 and is secured thereto by the thumb screw 34. A handle member 35 is provided at the end of the crank arm and by which the knife is rotated.

It becomes apparent from the drawing that to dismember the machine all that is required, is to rotate the drum slightly so that the pins 24 of the said drum will be coincident with slots 20 of the disk 17 after which the said drum can be readily withdrawn for purposes of cleansing or interchange.

By disengaging the thumb screw 34 from shank 31 the crank handle 32 can be detached so that the shaft 30 can be withdrawn from the hole 19 in the disk 11. From the foregoing it is obvious that by reversing the said operation, the food chopper can be just as readily assembled.

It is obvious that drums having various combinations, arrangements and sizes of holes can be provided without departing from the spirit and scope of my invention.

I claim:

1. A machine of the class described comprising a disk member having a bracket formed thereto, extension secured to the lower end of the bracket adapted to releasably secure the machine to a table, said disk further having diametrically opposed pins and slots formed thereon, a hollow drum, diametrically opposed pin members formed at the open end of the drum and converging toward the center, said drum pins adapted to engage the wall of the disk after passing through the slots in the disk, a spirally formed knife engaging the wall of the drum interiorly and means for rotating the said knife.

2. A machine of the class described comprising a disk having a vertically disposed bracket formed thereon, said disk having a hole passing centrally therethrough and adapted to revolubly receive a shaft having a square shank at the end of the shaft, a spirally formed knife having a cutting edge formed thereon, a leg extension formed on the side opposite to the cutting edge, said hollow drum adapted to receive the said knife member, said leg of the said knife member adapted to keep the knife edge in intimate contact with the inner peripheral surface of the said drum, and means for ejecting the dismembered food from the drum chamber.

In witness whereof I, affix my signature.

PAUL LIEBELT.